United States Patent
Garrity et al.

(10) Patent No.: US 10,056,759 B2
(45) Date of Patent: Aug. 21, 2018

(54) RENEWABLE ENERGY POWER GENERATION SYSTEMS

(71) Applicant: Tesla, Inc., Palo Alto, CA (US)

(72) Inventors: Paul Garrity, Rockwall, TX (US); Aaron Michael Jungreis, San Mateo, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/632,259

(22) Filed: Jun. 23, 2017

(65) Prior Publication Data

US 2017/0288407 A1    Oct. 5, 2017

Related U.S. Application Data

(63) Continuation of application No. 14/941,427, filed on Nov. 13, 2015, now Pat. No. 9,722,423, which is a
(Continued)

(30) Foreign Application Priority Data

Nov. 25, 2011    (GB) .................................. 1120367.6

(51) Int. Cl.
  *H02J 3/38*    (2006.01)
  *H02M 5/458*    (2006.01)
(52) U.S. Cl.
  CPC ............. *H02J 3/383* (2013.01); *H02M 5/458* (2013.01)
(58) Field of Classification Search
  CPC ............. H02J 1/10; H02J 1/102; H02M 7/493
(Continued)

(56) References Cited

U.S. PATENT DOCUMENTS

| | | |
|---|---|---|
| 2,367,925 A | 1/1945 | Brown |
| 4,104,687 A | 8/1978 | Zulaski |
| (Continued) | | |

FOREIGN PATENT DOCUMENTS

| | | |
|---|---|---|
| DE | 3236071 A1 | 1/1984 |
| DE | 202010006020 U1 | 10/2011 |
| (Continued) | | |

OTHER PUBLICATIONS

UK Intellectual Property Office Examination Report, dated Sep. 15, 2014, for British patent application No. GB1120367.6, 2 pages.
(Continued)

*Primary Examiner* — Nguyen Tran
(74) *Attorney, Agent, or Firm* — Kilpatrick Townsend & Stockton LLP

(57) ABSTRACT

We describe a modular adjustable power factor renewable energy inverter system. The system comprises a plurality of inverter modules having a switched capacitor across its ac power output, a power measurement system coupled to a communication interface, and a power factor controller to control switching of the capacitor. A system controller receives power data from each inverter module, sums the net level of ac power from each inverter, determines a number of said capacitors to switch based on the sum, and sends control data to an appropriate number of the inverter modules to switch the determined number of capacitors into/out of said parallel connection across their respective ac power outputs.

10 Claims, 15 Drawing Sheets

Related U.S. Application Data continuation of application No. 14/446,319, filed on Jul. 29, 2014, now Pat. No. 9,209,710, which is a continuation of application No. 13/769,275, filed on Feb. 15, 2013, now Pat. No. 8,823,212, which is a continuation of application No. 13/310,691, filed on Dec. 2, 2011, now Pat. No. 8,391,032.

(58) Field of Classification Search
USPC .................................. 363/65–72; 307/82
See application file for complete search history.

(56) References Cited

U.S. PATENT DOCUMENTS

| | | | |
|---|---|---|---|
| 4,321,581 A | 3/1982 | Tappeneiner et al. | |
| 4,453,207 A | 6/1984 | Paul | |
| 4,545,997 A | 10/1985 | Wong et al. | |
| 4,554,502 A | 11/1985 | Rohatyn | |
| 4,626,983 A | 12/1986 | Harada et al. | |
| 4,683,529 A | 7/1987 | Bucher, II | |
| 4,772,994 A | 9/1988 | Harada et al. | |
| 5,329,222 A | 7/1994 | Gyugi et al. | |
| 5,576,941 A | 11/1996 | Nguyen et al. | |
| 5,734,565 A | 3/1998 | Mueller et al. | |
| 5,814,970 A | 9/1998 | Schmidt | |
| 5,859,772 A | 1/1999 | Hilpert | |
| 6,219,623 B1 | 4/2001 | Wills | |
| 6,429,546 B1 | 8/2002 | Ropp et al. | |
| 6,933,714 B2 | 8/2005 | Fasshauer et al. | |
| 7,061,211 B2 | 6/2006 | Satch et al. | |
| 7,095,597 B1 | 8/2006 | Cousineau | |
| 7,142,997 B1 | 11/2006 | Widner | |
| 8,391,032 B2 | 3/2013 | Garrity et al. | |
| 8,624,443 B2 | 1/2014 | Mumtaz | |
| 8,823,212 B2 | 9/2014 | Garrity et al. | |
| 2002/0180408 A1 | 12/2002 | McDaniel et al. | |
| 2004/0164718 A1 | 8/2004 | McDaniel et al. | |
| 2005/0179420 A1 | 8/2005 | Satoh et al. | |
| 2007/0221267 A1* | 9/2007 | Fornage | H02M 3/285 136/244 |
| 2008/0278980 A1 | 11/2008 | Lu | |
| 2008/0291707 A1 | 11/2008 | Fang | |
| 2008/0304296 A1 | 12/2008 | NadimpalliRaju et al. | |
| 2009/0283129 A1 | 11/2009 | Foss | |
| 2010/0001698 A1* | 1/2010 | Johnson | H02J 3/1864 323/209 |
| 2010/0246226 A1 | 9/2010 | Ku et al. | |
| 2010/0309695 A1 | 12/2010 | Fomage | |
| 2012/0049637 A1 | 3/2012 | Teichmann | |
| 2012/0098336 A1 | 4/2012 | Gurunathan et al. | |
| 2014/0246927 A1 | 9/2014 | Mumtaz | |
| 2014/0306543 A1 | 10/2014 | Garrity et al. | |

FOREIGN PATENT DOCUMENTS

| | | |
|---|---|---|
| EP | 0 576 271 A2 | 12/1993 |
| EP | 1 187 291 A2 | 3/2002 |
| EP | 2 164 147 A2 | 3/2010 |
| GB | 2 415 841 A | 1/2006 |
| GB | 2 497 275 A | 6/2013 |
| JP | 2004-312994 A | 11/2004 |
| WO | 2006/048688 A1 | 5/2006 |
| WO | 207/080429 A2 | 7/2007 |
| WO | 2013/076451 A1 | 5/2013 |

OTHER PUBLICATIONS

UK Intellectual Property Office Search Report, dated Apr. 8, 2013, for British patent application No. GB1120367.6, 1 page.

International Search Report and Written Opinion, dated Feb. 27, 2013, for International patent application PCT/GB2012/052570, 9 pages.

Author Unknown, "DC Combiner Box Enables Better Awareness for Active Management," SolarMagic DC Monitoring Combiner Box Specifications Apr. 2011, 2 pages, National Semiconductor Corporation.

Author Unknown, "SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.

Calais, Martina, et al., "Inverters for Single-Phase Grid Connected Photovoltaic Systems-Overview and Prospects," Proceedings of the 17th European Photovoltaic Solar Energy Conference, Oct. 22-26, 2001, pp. 437-440, Munich, Germany.

Cordonnier, Charles-Edouard, et al., "Application Considerations for Sensefet™ Power Mosfet Devices," PCI Proceedings, May 11, 1987, pp. 47-65.

Marra, Enes Gonçalves et al., "Self-Excited Induction Generator Controlled by a VS-PWM Converter Providing High Power-Factor Current to a Single-Phase Grid," Proceedings of the 24th Annual Conference of IEEE, Aug. 31-Sep. 4, 1998, pp. 703-708, vol. 2, IEEE.

Naik, R., et al., "A Novel Grid Interface for Photovoltaic, Wind-Electric, and Fuel-Cell Systems with a Controllable Power Factor of Operation," Applied Power Electronics Conference and Exposition, Mar. 5-9, 1995, pp. 995-998, IEEE.

Petkanchin, L., "Processes Following Changes of Phase Angle Between Current and Voltage in Electric Circuits," IEEE Power Engineering Review, Aug. 1999, pp. 59-60, vol. 19, Issue 8, IEEE.

Rodriguez, C., et al., "Dynamic Stability of Grid-Connected Photovoltaic Systems," Power Engineering Society General Meeting, Jun. 6-10, 2004, 7 pages, IEEE.

* cited by examiner

RENEWABLE ENERGY POWER GENERATION SYSTEMS

CROSS-REFERENCES TO RELATED APPLICATIONS

This application is a continuation of U.S. application Ser. No. 14/941,427, filed Nov. 13, 2015, which is a continuation of U.S. application Ser. No. 14/446,319, filed Jul. 29, 2014, now issued as U.S. Pat. No. 9,209,710, which is a continuation of U.S. application Ser. No. 13/769,275, filed Feb. 15, 2013, now issued as U.S. Pat. No. 8,823,212, which is a continuation of U.S. application Ser. No. 13/310,691, filed Dec. 2, 2011, now issued as U.S. Pat. No. 8,391,032, which claims the benefit of an earlier-filed United Kingdom Patent Application 1120367.6, filed Nov. 25, 2011, all of which are incorporated by reference herein.

FIELD OF THE INVENTION

This invention relates to systems and methods for generation of electrical power from renewable sources, in particular solar photovoltaic (PV) power generation systems. More particularly the invention relates to VAR (volt-ampere reactive) control in such systems.

BACKGROUND TO THE INVENTION

As the skilled person will be aware, VAR power refers to an imaginary component of the total power supplied by a power generation system, resulting from driving a reactive load such that the current and voltage are out of phase with one another. Driving an inductive load causes the current to lag the voltage, and vice versa for a capacitive load. Thus the reactive component of power can be compensated by adding capacitance/inductance as needed. The degree of reactive power is specified by the power factor cos Φ where Φ is the phase angle between the current and the voltage.

Examples of reactive power control systems can be found in, inter alia: US2010/246226; U.S. Pat. No. 7,142,997; US2004/164718; US2002/180408; U.S. Pat. No. 4,683,529; U.S. Pat. No. 4,545,997; U.S. Pat. No. 4,554,502; and U.S. Pat. No. 4,453,207.

New grid requirements are being imposed in regions where power generation from renewable sources, in particular solar, is becoming a larger proportion of total power generation. In particular these place requirements on VAR control for reactive power correction where differing sources supplying power to the grid could otherwise force the grid into an under-excited or over-excited mode during peak and off-peak cycles of the overall system. Thus, for example, the ability to absorb or export VLRs is required by new standards in Germany, in particular VDE4105, which will be mandatory for new products from January 2012. Thus the ability to react and correct and/or actively damp VARs is highly desirable.

SUMMARY OF THE INVENTION

According to the invention there is therefore provided a modular adjustable power factor renewable energy inverter system, the system comprising: a plurality of inverter modules each having a dc power input and an ac power output; a common grid power feed coupled to each said inverter module ac power output; and a system controller having a communications link to each said solar inverter module to receive power data from the inverter module and to send control data to the inverter; wherein each said solar inverter module further comprises: a series combination of a capacitor and a controllable switching device connected in parallel across said ac power output; a communication interface for communicating with said system controller; a power measurement system coupled to said communication interface to measure one or more parameters relating to a net level of ac power provided by said inverter module to said common grid power feed, and to provide power data, defining said net level of ac power provided, to said communications interface for transmission to said system controller; and a power factor controller, coupled to said communications interface to receive control data from said system controller, and coupled to said controllable switching device to control said switching device in response to said control data to switch said capacitor into/out of parallel connection across said ac power output of said inverter module; and wherein said system controller is configured to: receive said power data from each said inverter module; sum the net level of ac power from each said inverter module to determine a total net level of ac power provided by said plurality of inverter modules to said common grid power feed; determine a number of said capacitors to switch into/out of parallel connection across their respective said ac power outputs responsive to said total net level of ac power; and send control data to said inverter modules to switch said determined number of capacitors into/out of said parallel connections.

Embodiments of the above described system facilitate the implementation of a flexible and cost effective renewable power system, in particular a solar inverter system. There is no need for bi-directional current flow through the output, unfolding stage of the inverter. Also, because the switched capacitors are distributed amongst the solar inverter modules rather than being centralised, the system can easily be upgraded or otherwise modified to change the power generation capability, simply by adding or removing inverter modules. This is because each module is provided with separate VAR control whilst the overall VAR of the ensemble of modules is managed by a centralised system controller. In this manner very tight requirements on the overall system power factor can be met in a cost-effective manner. In some preferred embodiments the ensemble of modules and system controller are connected by a wireless local area network, for example a Zigbee™ network, to carry the power and control data by, thereby facilitate installation and upgrade of the system as required.

In some preferred implementations of the system the system controller determines a fraction of a total maximum (rated) ac power output of the system being provided by the set of inverter modules at any one time. The controller then uses this information to determine the number of capacitors to switch in parallel with the ac outputs of the respective modules, then sending control signals to that number of inverter modules to switch the capacitors into parallel connection across their respective ac power outputs. The switching in/out of a capacitor may employ on/off control to switch the capacitor in or out, or may employ phase control, to control a proportion of an ac cycle for which the capacitor is switched in, to provide a variable degree of power factor compensation.

In preferred implementations the system controller applies a threshold to the determined fraction of maximum power being provided such that until this is reached no capacitors are switched in. In embodiments this threshold fraction is 0.5 (50%). Beyond this point additional inverter modules are controlled to incrementally increase the number of inverter modules applying a capacitor across their respective ac output, thus increasing the total applied capacitance in a stepwise fashion to control the displacement power factor of the system. In this way in principle the desired power factor response can be approximated to an arbitrary degree of accuracy by employing sufficiently small steps. In practice the number of steps (inverters/capacitors) depends upon the tolerance permitted for the system.

In embodiments the change in displacement power factor above the threshold is approximately linear. This is because, in embodiments, an inverter produces a sinusoidal voltage/current waveform in phase with the grid so that the power factor of the inverter by itself—that is, not including the capacitor—is close to unity. In practice, however, the power factor is not precisely unity and in embodiments the system controller may include a lookup table storing data defining the number of inverter modules/capacitors to switch in/out in response to the fraction of the total power being supplied. (The skilled person will appreciate that the system is quasi-linear in displacement power factor rather than phase angle since power factor is dependent on cos Φ).

In embodiments the system employs open loop control of the displacement power factor—that is the system does not need to measure a power factor in order to compensate to provide the desired response: instead the system controller merely senses (measures) the power output level of each inverter and then controls the overall displacement power factor based on a percentage of the total power available. Thus each inverter module only needs to know its own output power, and to report this to the system controller (gateway), which adds up the individual power contributions to determine the overall number of capacitors to apply for dissipation power factor compensation. Broadly speaking, more capacitors are employed if the inverters are providing a greater percentage of the total potential power output, subject to a 50% break point—that is no capacitors are applied below this power level.

In embodiments an individual inverter knows its net power output because the RMS voltage is known (or measured) and because the output current amplitude is known because this is controlled. Thus an inverter also knows the percentage of the full power output current it is providing and therefore the power measurement parameter or parameters provided back to the system controller may either comprise an absolute value of an output current or a percentage of a total potential output current, or an absolute output power or a percentage of a total output power. Based upon this the system controller, via the commutations network, can then control the local power factor controllers switching the capacitors in/out thus although a control loop is employed in the sense that an inverter measures power output or a parameter dependent upon this, provides this to the system controller, and then receives back control data for switching its capacitor in/out, the system is open loop in the sense that the displacement power factor per se is not measured. This approach significantly simplifies the overall system design and further, because the capacitors are distributed amongst the ensemble of modules, there are further savings in cost and physical size, as well as improvements in reliability and efficiency.

The above described techniques can be employed with either a single phase or a three phase solar power generation system; in a three phase system preferably one set of solar inverter modules is provided for each phase. The system controller may then implement a separate control loop for each phase, in effect controlling the dissipation power factor for each set of inverter modules independently.

In principle the device switching a capacitor in/out of parallel connection across the ac output of an inverter module may be an electromechanical device. However in some preferred implementations a triac is employed as the electronic switch as this is particularly effective in handling power surges. Where a triac is employed this may be turned on by a single pulse (or current) timed to be provided when the current through the device is increasing (so that it latches), or by a train of pulses (which relaxes the timing requirements). Turning the device on with a single pulse can, in embodiments, be preferable as less power is required. The skilled person will appreciate that suitable electronic switching devices are not limited to triacs—for example a pair of back to back MOSFETs may alternatively be employed.

Preferably where an electronic switching device is employed, this is turned on (or off) substantially at the peak of the grid voltage. This is because the current in the capacitor is 90° out of phase with this voltage and thus the peak grid voltage coincides with a capacitor current of substantially zero. However initially the electronic switching device may be switched in at a zero-crossing of the grid voltage, to reduce stress on the VAR control capacitor(s).

Thus where a triac is employed, preferably the triac is first switched on at a zero-crossing of the grid voltage. In embodiments of this approach the power factor controller may configured to generate a train of pulses for at least one complete cycle of the grid power to control the triac on, preferably generating the pulse train for a plurality of cycles of the grid power, for example more than 5 or 10 complete cycles. Then, after allowing time for the switching transient to die down, the triac may be driven by a single pulse or pulse train at substantially a peak voltage of the ac power.

In a related aspect the invention provides a method of controlling power factor in a renewable energy inverter system, the method comprising: providing a plurality of inverter modules each having a dc power input and an ac power output; coupling the ac power output of each said inverter module to a common grid power feed; providing each said inverter module with at least one reactive element switchable to be connected to a said ac power output; and controlling a dissipation power factor of said inverter system by: monitoring the ac power provided to said common grid power feed by each said inverter module to determine a total ac power provided to said common grid feed by said plurality of inverter modules; determining a number of said inverter modules to control, dependent on a proportion of a maximum power output of said inverter system represented by said total ac power provided to said common grid feed; and controlling said determined number of inverter modules to switch said reactive element into the respective said ac power output to control the displacement power factor of said inverter system.

As previously described, embodiments of this method facilitate a distributed, extendable solar inverter system with accurate power factor control. In some preferred implementations the inverter includes an output stage with a current source inverter topology, which can provide a lagging power factor. Then the reactive element may be a capacitor arranged so that it can be switched into/out of parallel connection with the ac power output of its inverter. However in principle similar techniques to those described above may also be employed with a series inductance.

In some preferred embodiments of the technique each inverter has a just a single switched capacitance (albeit this may be implemented as multiple capacitors connected together), but in principle multiple switched capacitances may be provided for each inverter module. Again the switching in/out of a capacitor may employ on/off control to switch the capacitor in or out, or may employ phase control, to control a proportion of an ac cycle for which the capacitor is switched in, to provide a variable degree of power factor compensation.

The method of controlling the power factor of the system may include a design step of selecting one or both of a number of solar inverter modules (and their respective ratings), and a number of switchable capacitors (where a capacitor may be implemented by a plurality of parallel connected physical devices) in each module to provide the facility for stepwise control of the displacement power factor to within a desired tolerance limit, for example +/−1%. In embodiments the tolerance limit may be better than 5%, 3%, 2%, or 1% (that is, better than +/−2.5%, 1.5%, 1%, or 0.5%).

In operation, as previously described, in embodiments there is a threshold level of summed power from the inverter modules below which none of the capacitors of the inverter modules are connected across their respective ac outputs. This may be, for example, 50% of the available maximum power output.

As previously mentioned, although some preferred implementations of the technique are employed in a solar photovoltaic power conversion system, in principle similar techniques may also be employed in other renewable power generation systems, in particular where multiple, relatively small power sources are connected together to provide power to the grid.

In a related aspect the invention provides a modular adjustable power factor renewable energy inverter system, the system comprising: a plurality of inverter modules each having a dc power input and an ac power output, each further comprising at least one reactive element switchable to be connected to a said ac power output; a common grid power feed coupled to each said inverter module ac power output; and a power factor controller for controlling a dissipation power factor of said inverter system, wherein said power factor controller is configured to: monitor the ac power provided to said common grid power feed by each said solar inverter module to determine a total ac power provided to said common grid feed by said plurality of inverter modules; determine a number of said inverter modules to control, dependent on a proportion of a maximum power output of said inverter system represented by said total ac power provided to said common grid feed; and control said determined number of inverter modules to switch said reactive element into the respective said ac power output to control the displacement power factor of said inverter system.

In embodiments of the system, the system controller may be implemented in hardware, or in software for example on a microcontroller or digital signal processor, or in a combination of the two. Thus the invention also provides processor control code on a physical data carrier such as a disk, configured to implement the system controller. his code (and/or data) may comprise code for controlling a processor or code for setting up or controlling a ASIC, or FPGA, or code for a hardware description language.

As the skilled person will appreciate, the functions of the system controller may either be implemented at one point in the system or maybe distributed between a plurality of coupled components in communication with one another. For example the functions of the system controller may be shared amongst the inverter modules.

BRIEF DESCRIPTION OF THE DRAWINGS

These and other aspects of the invention will now be further aspects of the invention will now further described, by way of example only, with reference to the accompanying figures in which:

FIGS. 7a and 7b show, respectively, a graph of system displacement power factor against the target requirement of FIG. 1a, and the power factor error in tracking the curve of FIG. 1a.

DETAILED DESCRIPTION OF PREFERRED EMBODIMENTS

VAR control is required where grid requirements mandate leading or lagging control over the output of any grid connected power source. Typical requirements provide limits in the range.

Figure 1A:
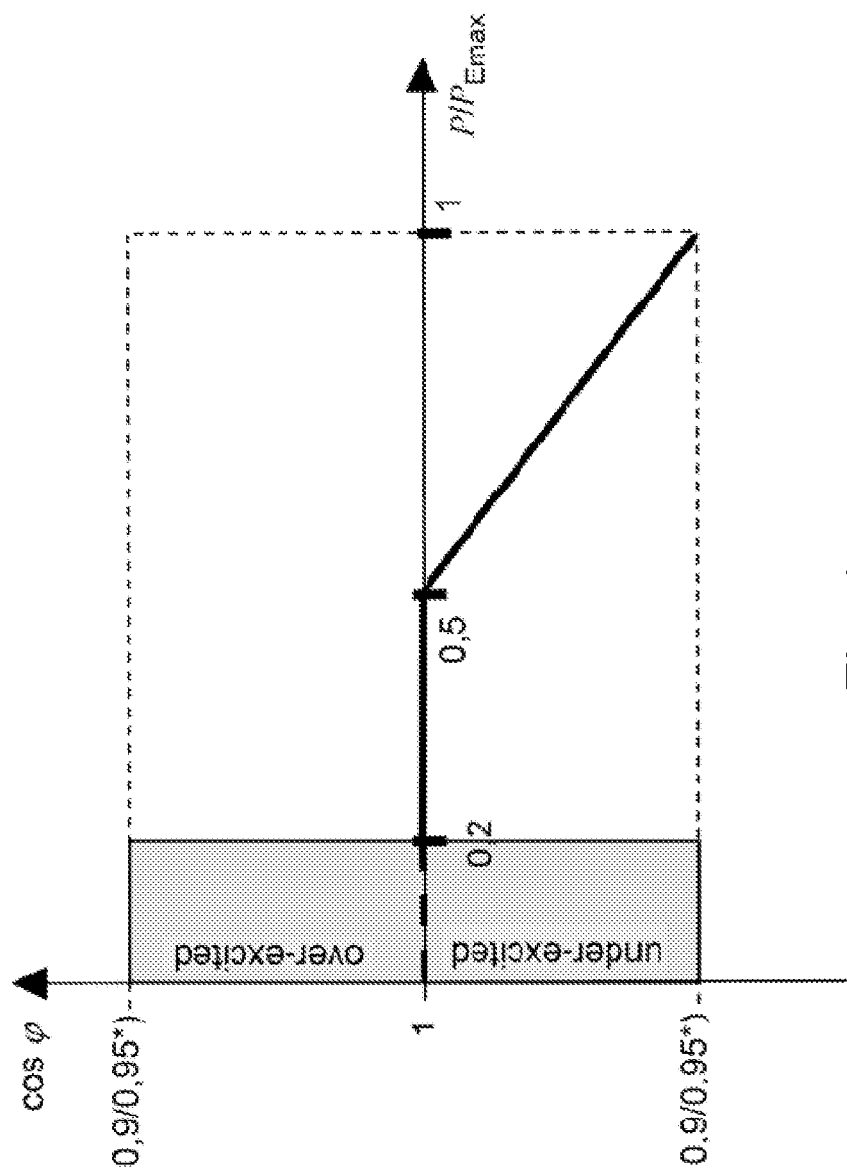
FIGS. 1a and 1b show, respectively, power factor requirements according to German standard VDE4105, and an outline block diagram of an example power conditioning unit.

FIG. 1a shows VDE4105 requirements in which the power factor of systems above 3.68 kVA must be continuously controlled based on percentage of full load system power. The power factor for systems above 13.8 kVA follows the 0.9 curve, those below 13.8 kVA follow the 0.95 curve.

Further, power sources must be capable of being programmed to a specific power factor in overexcited and under-excited conditions with a latency of 10 seconds. We address this by employing feedback from the sub-source, a micro-inverter, in the context of a combined system of multiple micro-inverters' connected to grid. In embodiments the ability to close this feedback loop and to control power factor (per phase in a three phase system) to within 0.01 (cos Φ) enables high accuracy and control at the grid connection point.

Power Conditioning Units

Figure 1B:
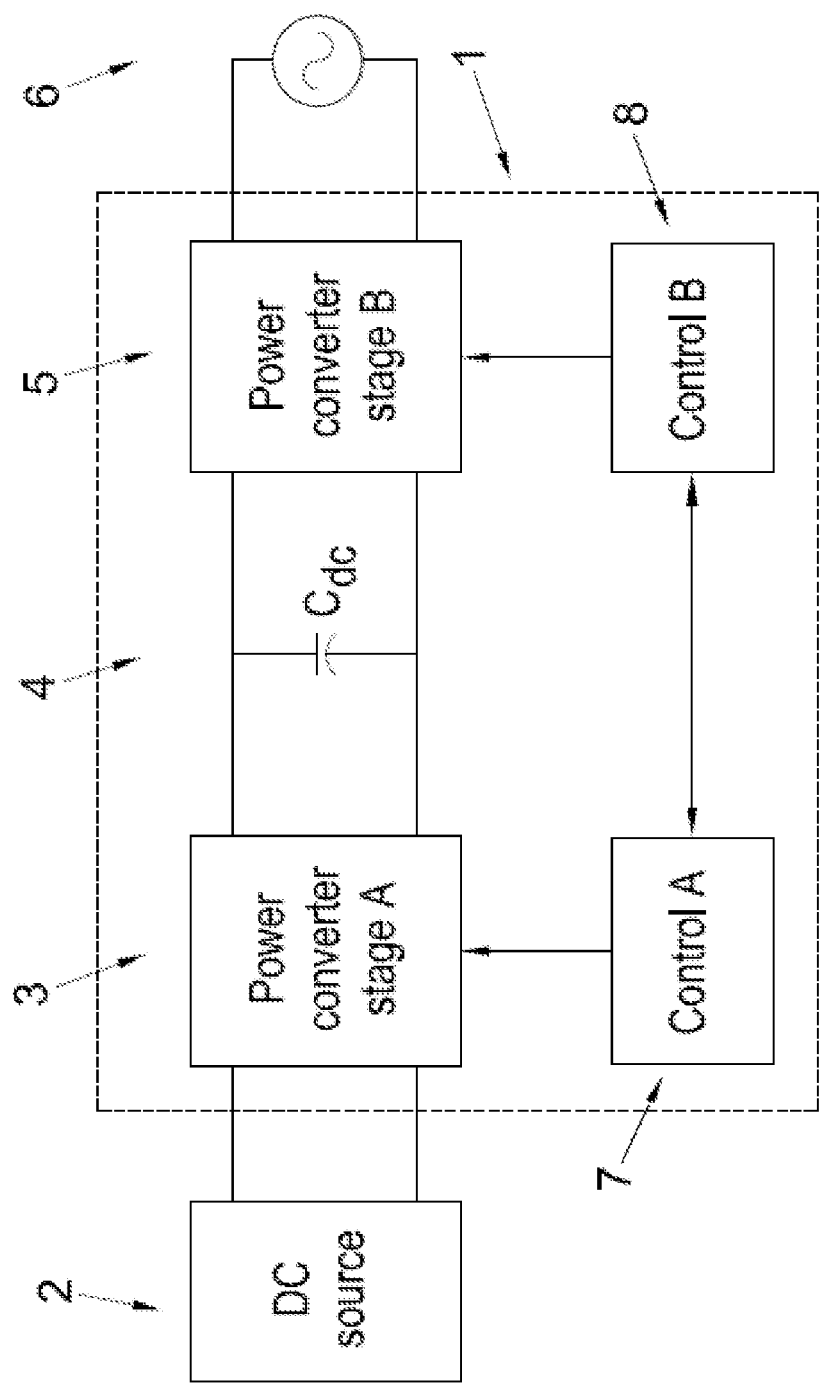

By way of background and context, to assist in understanding the operation of embodiments of the invention we first describe an example photovoltaic power conditioning unit. Thus in FIG. 1b shows photovoltaic power conditioning unit of the type we described in WO2007/080429. The power converter 1 is made of three major elements: a power converter stage A, 3, a reservoir (dc link) capacitor $C_{dc}$ 4, and a power converter stage B, 5. The apparatus has an input connected to a direct current (dc) power source 2, such as a solar or photovoltaic panel array (which may comprise one or more dc sources connected in series and/or in parallel). The apparatus also has an output to the grid main electricity supply 6 so that the energy extracted from the dc source is transferred into the supply. Capacitor $C_{dc}$ is preferably non-electrolytic, for example a film capacitor.

The power converter stage A may be, for example, a step-down converter, a step-up converter, or it may both amplify and attenuate the input voltage. In addition, it generally provides electrical isolation by means of a transformer or a coupled inductor. In general the electrical conditioning of the input voltage should be such that the voltage across the dc link capacitor $C_{dc}$ is always higher than the grid voltage. In general this block contains one or more transistors, inductors, and capacitors. The transistor(s) may be driven by a pulse width modulation (PWM) generator. The PWM signal(s) have variable duty cycle, that is, the ON time is variable with respect to the period of the signal. This variation of the duty cycle effectively controls the amount of power transferred across the power converter stage A.

The power converter stage B injects current into the electricity supply and the topology of this stage generally utilises some means to control the current flowing from the capacitor $C_{dc}$ into the mains. The circuit topology may be either a voltage source inverter or a current source inverter.

Figure 2A:
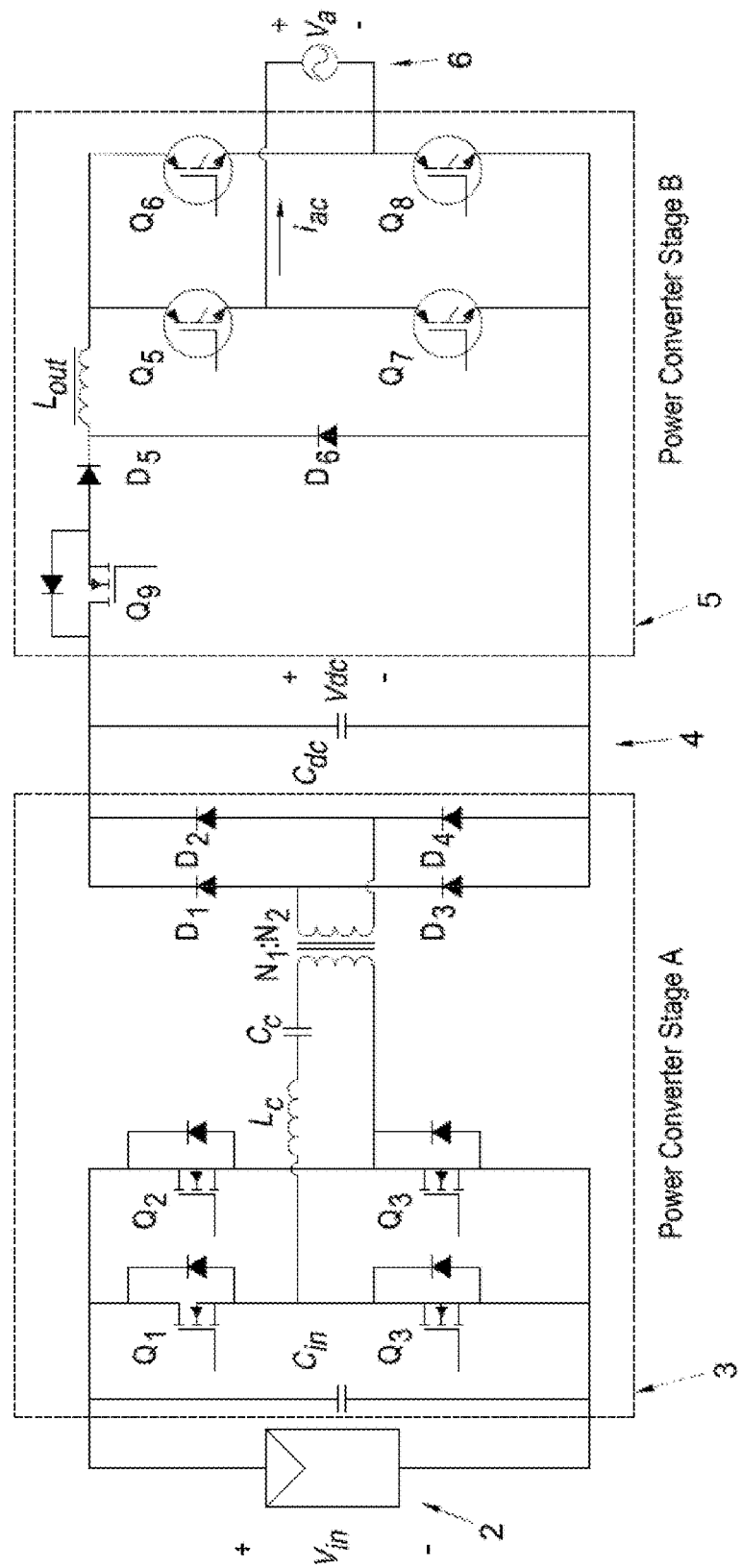
FIGS. 2a and 2b show details of a power conditioning unit of the type shown in FIG. 1b.

FIG. 2 shows details of an example of a power conditioning unit of the type shown in in FIG. 1b; like elements are indicated by like reference numerals. In FIG. 2a Q1-Q4, D1-D4 and the transformer form a dc-to-dc conversion stage, here a voltage amplifier. In alternative arrangements only two transistors may be used; and/or a centre-tapped transformer with two back-to-back diodes may be used as the bridge circuit.

In the dc-to-ac converter stage, Q9, D5, D6 and Lout perform current shaping. In alternative arrangements this function may be located in a connection between the bridge circuit and the dc link capacitor: $D_6$ acts as a free-wheeling diode and $D_5$ prevents current form flowing back into the dc-link. When transistor $Q_9$ is switched on, a current builds up through $L_{out}$. When $Q_9$ is switched off, this current cannot return to zero immediately so $D_6$ provides an alternative path for current to flow from the negative supply rail ($D_5$ prevents a current flowing back into the dc-link via the body diode in $Q_9$ when $Q_9$ is switched off). Current injection into the grid is controlled using $Q_9$: when $Q_9$ is turned on the current flowing through $L_{out}$ increases and decreases when it is turned off (as long as the dc-link voltage is maintained higher than the grid voltage magnitude). Hence the current is forced to follow a rectified sinusoid which is in turn unfolded by the full-bridge output (transistors $Q_5$ to $Q_8$). Information from an output current sensor is used to feedback the instantaneous current value to a control circuit: The inductor current, $i_{out}$, is compared to a reference current, $i_{ref}$, to determine whether or not to switch on transistor $Q_9$. If the reference current is higher than $i_{out}$ then the transistor is turned on; it is switched off otherwise. The reference current, $i_{ref}$ may be generated from a rectified sinusoidal template in synchronism with the ac mains (grid) voltage.

Transistors Q5-Q8 constitutes an "unfolding" stage. Thus these transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Thus in embodiments the power conditioning unit comprises a generic dc-ac-dc that provides voltage amplification of the source to above the grid voltage, and isolation, and a current source inverter (CSI) connected to the mains. The current injection is regulated using current shaping (current-control) in the inductor of the CSI via the intermediate buck-type stage. (This is described further in our GB2415841B, incorporated by reference).

Control (block) A of FIG. 1b may be connected to the control connections (e.g. gates or bases) of transistors in power converter stage A to control the transfer of power from the dc energy source. The input of this stage is connected to the dc energy source and the output of this stage is connected to the dc link capacitor. This capacitor stores energy from the dc energy source for delivery to the mains supply. Control (block) A may be configured to draw such that the unit draws substantially constant power from the dc energy source regardless of the dc link voltage $V_{dc}$ on $C_{dc}$.

Control (block) B may be connected to the control connections of transistors in the power converter stage B to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{dc}$ on $C_{dc}$.

The capacitor $C_{dc}$ acts as an energy buffer from the input to the output. Energy is supplied into the capacitor via the power stage A at the same time that energy is extracted from the capacitor via the power stage B. The system provides a control method that balances the average energy transfer and allows a voltage fluctuation, resulting from the injection of ac power into the mains, superimposed onto the average dc voltage of the capacitor $C_{dc}$. The frequency of the oscillation can be either 100 Hz or 120 Hz depending on the line voltage frequency (50 Hz or 60 Hz respectively).

Figure 2B:
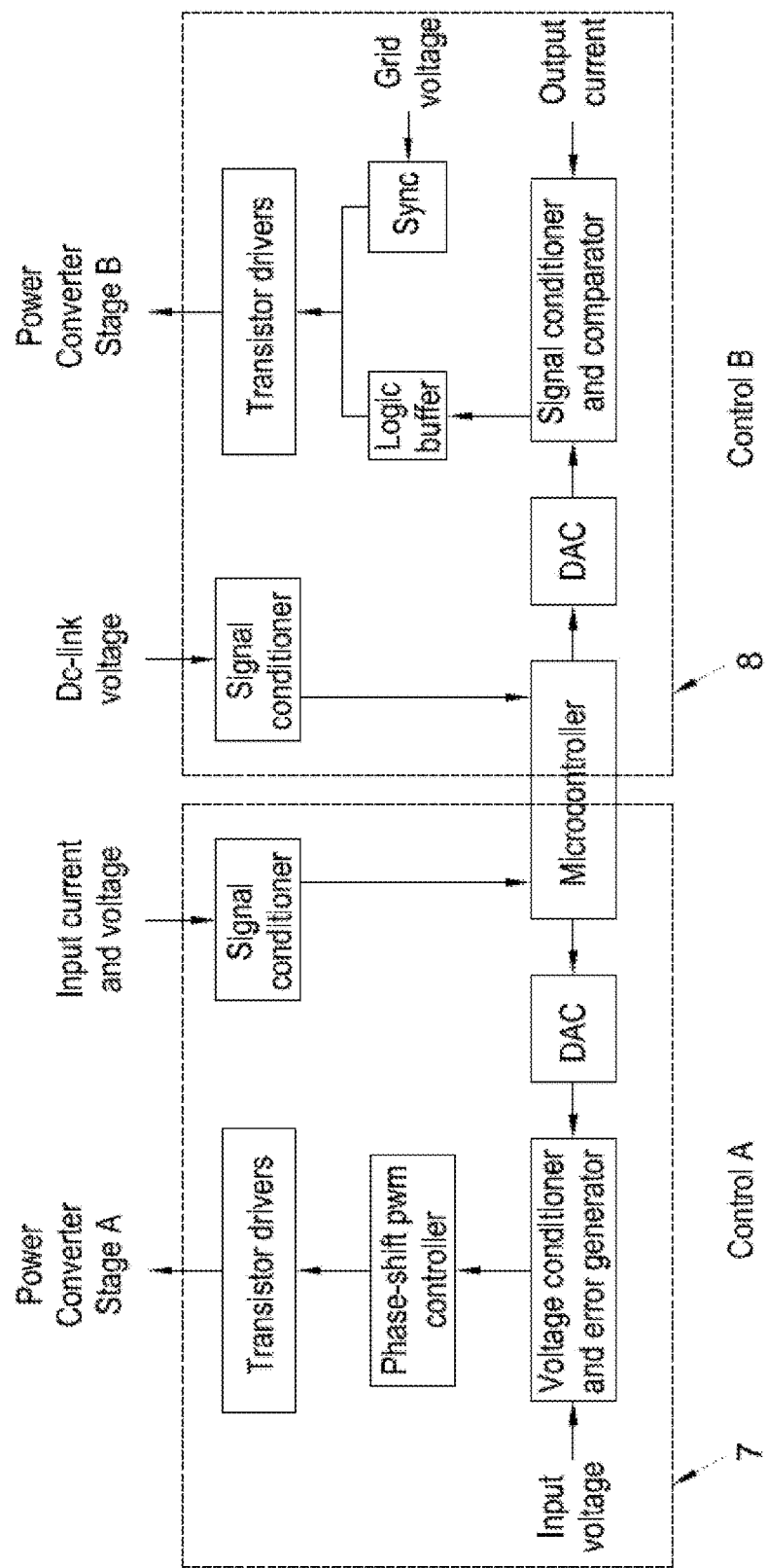

Two control blocks control the system: control block A controls the power stage A, and control block B power stage B. An example implementation of control blocks A and B is shown in FIG. 2b. In this example these blocks operate independently but share a common microcontroller for simplicity.

In broad terms, control block A senses the dc input voltage (and/or current) and provides a PWM waveform to control the transistors of power stage A to control the power transferred across this power stage. Control block B senses the output current (and voltage) and controls the transistors of power stage B to control the power transferred to the mains. Many different control strategies are possible. For example details of one preferred strategy reference may be made to our earlier filed WO2007/080429 (which senses the (ripple) voltage on the dc link)—but the embodiments of the invention we describe later do not rely on use of any particular control strategy.

In a photovoltaic power conditioning unit the microcontroller of FIG. 2b will generally implement an algorithm for some form of maximum power point tracking. In embodiments of the invention we describe later this or a similar microcontroller may be further configured to control whether one or both of the dc-to-dc power converter stages are operational, and to implement "soft" switching off of one of these stages when required. The microcontroller and/or associated hardware may also be configured to interleave the power transistor switching, preferable to reduce ripple as previously mentioned.

Figure 3A:
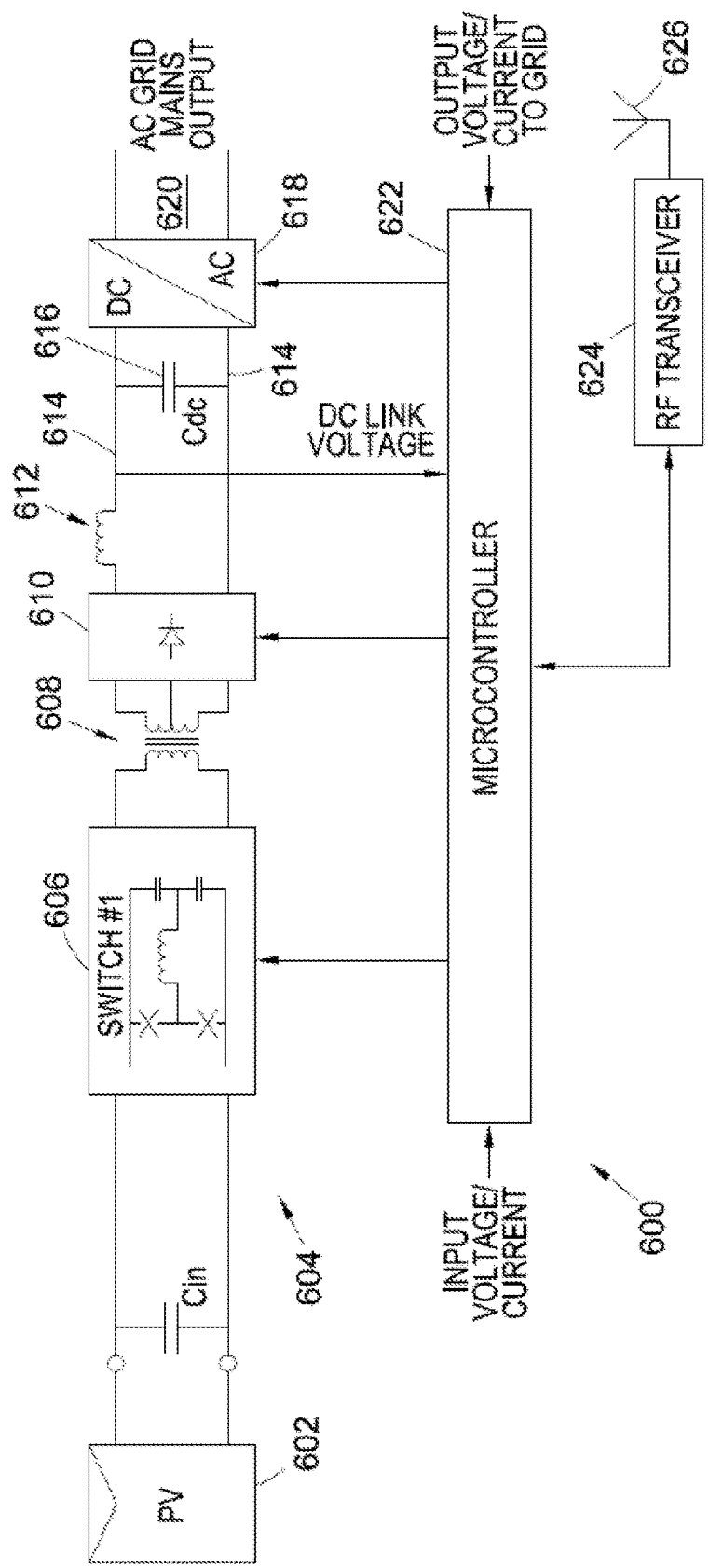
FIGS. 3a and 3b show details of a further example of solar photovoltaic inverter in which an input power converter incorporates an LLC resonant power converter.

Now referring to FIG. 3a, this shows a further example of a power conditioning unit 600. In the architecture of FIG. 3a a photovoltaic module 602 provides a dc power source for dc-to-dc power conversion stage 604, in this example each comprising an LLC resonant converter. Thus power conversion stage 604 comprises a dc-to-ac (switching) converter stage 606 to convert dc from module 602 to ac for a transformer 608. The secondary side of transformer 608 is coupled to a rectifying circuit 610, which in turn provides a dc output to a series-coupled output inductor 612. Output inductor 612 is coupled to a dc link 614 of the power conditioning unit, to which is also coupled a dc link capacitor 616. A dc-to-ac converter 618 has a dc input from a dc link and provides an ac output 620, for example to an ac grid mains supply.

A microcontroller 622 provides switching control signals to dc-to-ac converter 606, to rectifying circuit 610 (for synchronous rectifiers), and to dc-to-ac converter 618 in the output 'unfolding' stage. As illustrated microcontroller 622 also senses the output voltage/current to the grid, the input voltage/current from the PV module 602, and, in embodiments, the dc link voltage. (The skilled person will be aware of many ways in which such sensing may be performed). In some embodiments the microcontroller 622 implements a control strategy as previously described. As illustrated, the microcontroller 622 is coupled to an RF transceiver 624 such as a ZigBee™ transceiver, which is provided with an antenna 626 for monitoring and control of the power conditioning unit 600.

Figure 3B:
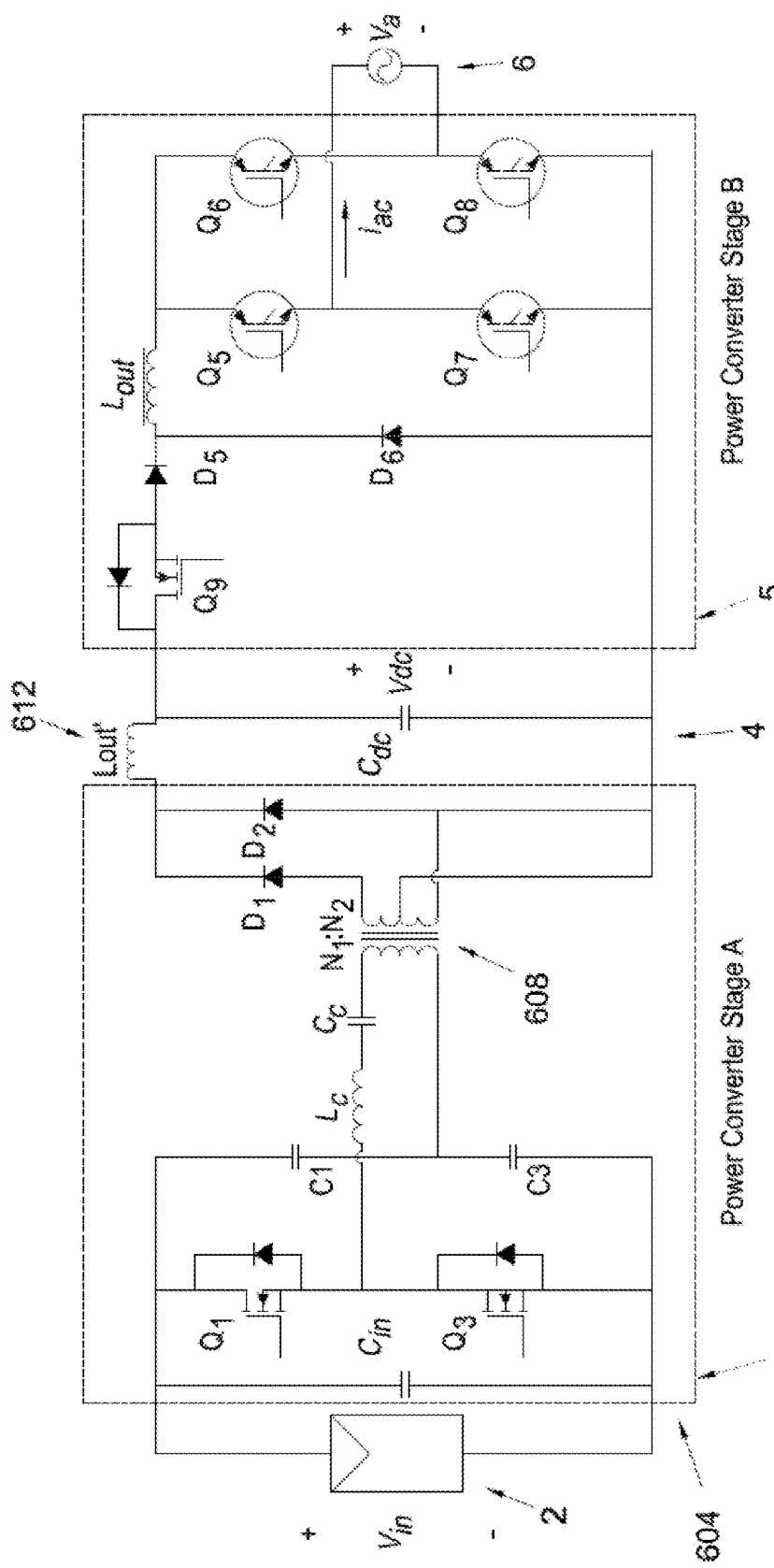

Referring now to FIG. 3b, this shows details of a portion of an example implementation of the arrangement of FIG. 3a. This example arrangement employs a modification of the circuit of FIG. 2a and like elements to those of FIG. 2a are indicated by like reference numerals; likewise like elements to those of FIG. 3a are indicated by like reference numerals. In the arrangement of FIG. 3b an LLC converter is employed (by contrast with FIG. 2a), using a pair of resonant capacitors C1, C3.

The circuits of FIGS. 1 to 3 are particularly useful for microinverters, for example having a maximum rate of power of less than 1000 Watts and or connected to a small number of PV modules, for example just one or two such modules. In such systems the panel voltages can be as low as 20 volts and hence the conversion currents can be in excess of 30 amps RMS.

VAR Control Techniques

We will now describe embodiments of a modular adjustable power factor solar inverter system which is able to track the power factor curve of FIG. 1a and, more particularly, which is able to provide a power factor which is adjustable in the range plus/minus 0.95 cos Φ with, in embodiments, an accuracy of 0.01 cos Φ. A power conditioning unit (solar inverter) of the type described above, with a controllable current source (Q9) and a series output inductance in the above example) followed by a grid frequency unfolding rectifier is able to provide a lagging power factor which can approach unity. This therefore addresses the −0.95 cos Φ requirement. Broadly speaking in embodiments of the system a leading power factor is provided by employing a switched capacitor arrangement (with control of the switching phase), but there are some additional techniques which are employed to facilitate control and upgrade of a modular system.

Figure 4A:
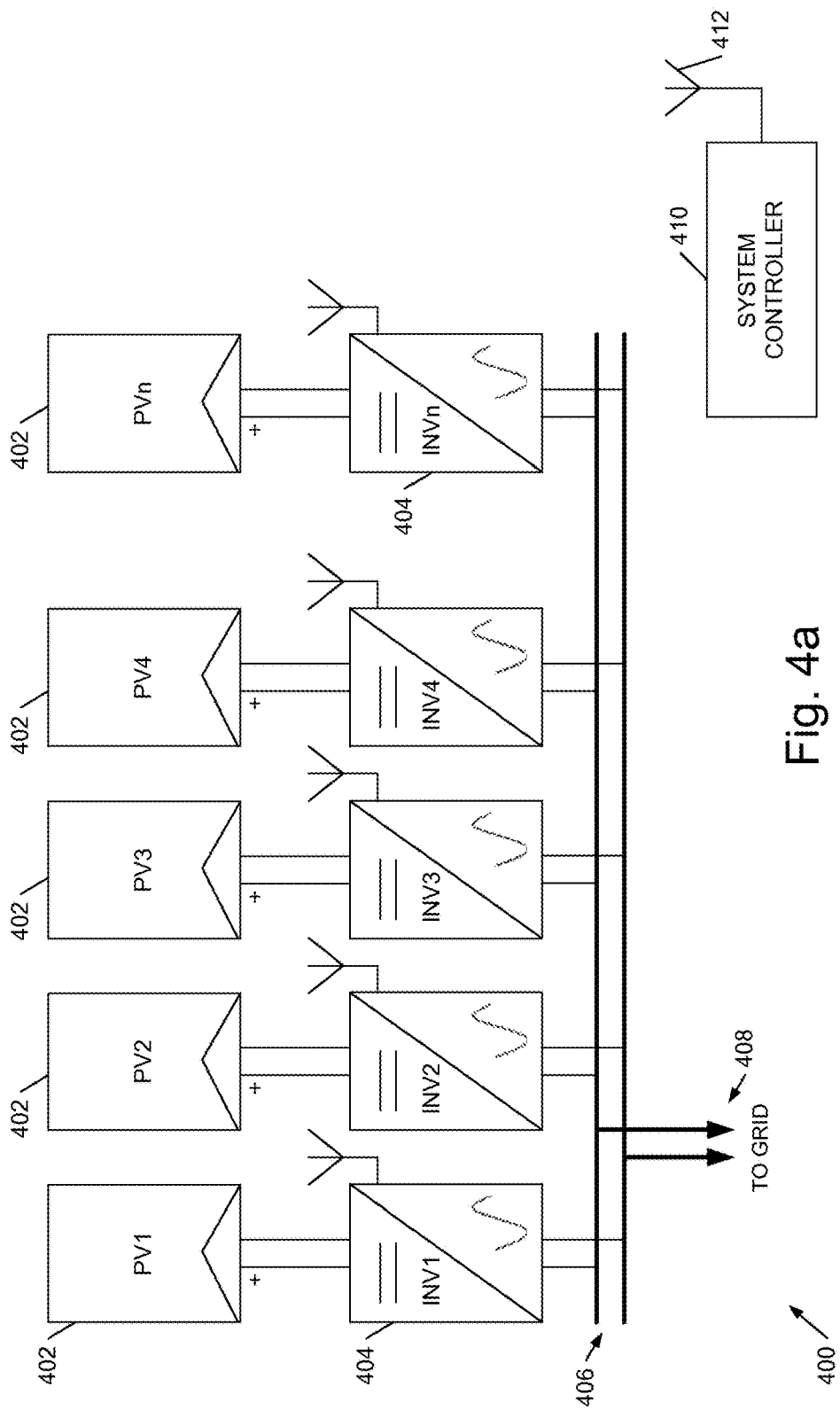
FIGS. 4a to 4c show, respectively, single phase and three phase modular adjustable power factor solar converter systems according to embodiments of the invention, and an example illustration of a residential property fitted with the system.

Thus referring to FIG. 4a, this shows an embodiment of a solar inverter system 400 comprising a set of PV panels 402 each providing dc power to a respective solar inverter or power conditioning unit 404, preferred embodiments of the type described above. Each inverter provides an ac grid mains output to a shared ac connection 406 which provides a common grid power feed 408. In embodiments of the system there are multiple solar inverters, each with a relatively small power output, as described further later. The system is controlled by system controller 410, for example using a Zigbee™ wireless network coupling an antenna 412 of the system controller to each of the inverters.

Each inverter includes a switched capacitor coupled to a power factor controller under control of system controller 410. As previously described, each inverter controls the output current and reads the RMS output voltage and thus is able to determine the percentage of its full power that the inverter is providing and/or an absolute measure of the power it is providing to the common grid tie 406, 408. Thus system controller 410 is able to determine the absolute power provided to the grid by each inverter and/or the percentage of an inverter's full power being provided by each inverter. The system controller 410 uses this information to control the switching of the capacitors in one or more of the inverters, as described later.

Figure 4B:
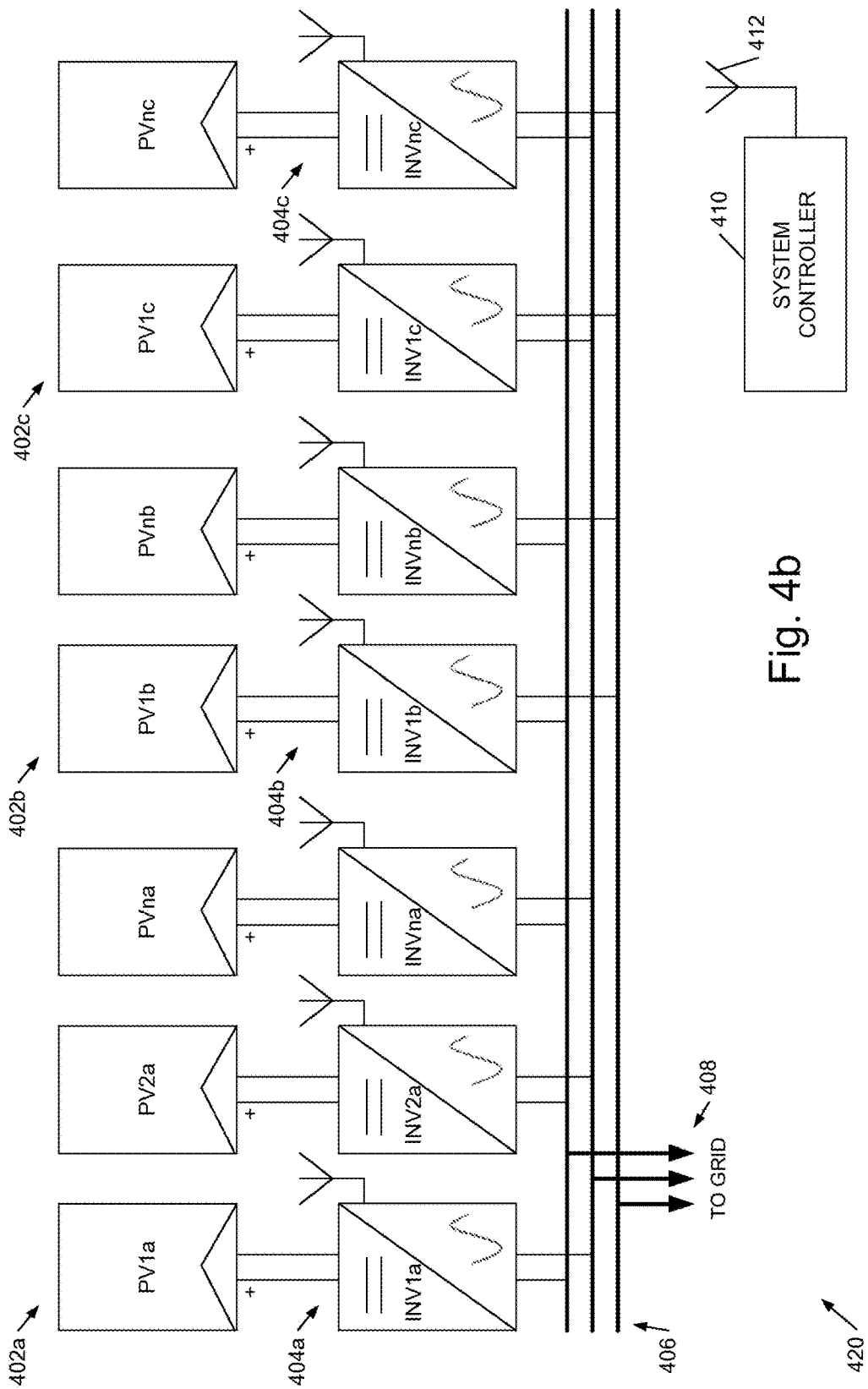

FIG. 4b illustrates a three phase solar inverter system 420 similar to that of 4a, in which like elements are indicated by like referencing numerals. In the example of FIG. 4b one set of inverters 404a,b,c, powered by respective sets of solar PV panels 402a,b,c, drives each phase of the grid mains, and each set of inverters driving each phase is separately controlled by system controller 410.

In embodiments of the three phase system shown in FIG. 4b optionally inverter modules 404 may provide information to the system controller 410 which enables the system controller to determine which inverter modules are connected to which individual phase of the three phase grid supply. This may comprise, for example, data identifying the timing of the of the sinusoidal voltage waveform on the ac output of the inverter, this information being sent to system controller 410 over the wireless network. From this timing information the system controller is able to determine which inverters are connected to which phase and therefore is able to determine which sets of inverters are to be controlled together to control the displacement power factor for each phase. Alternatively, information defining which inverter is connected to which phase may be programmed into the system controller, for example on installation.

Figure 4C:
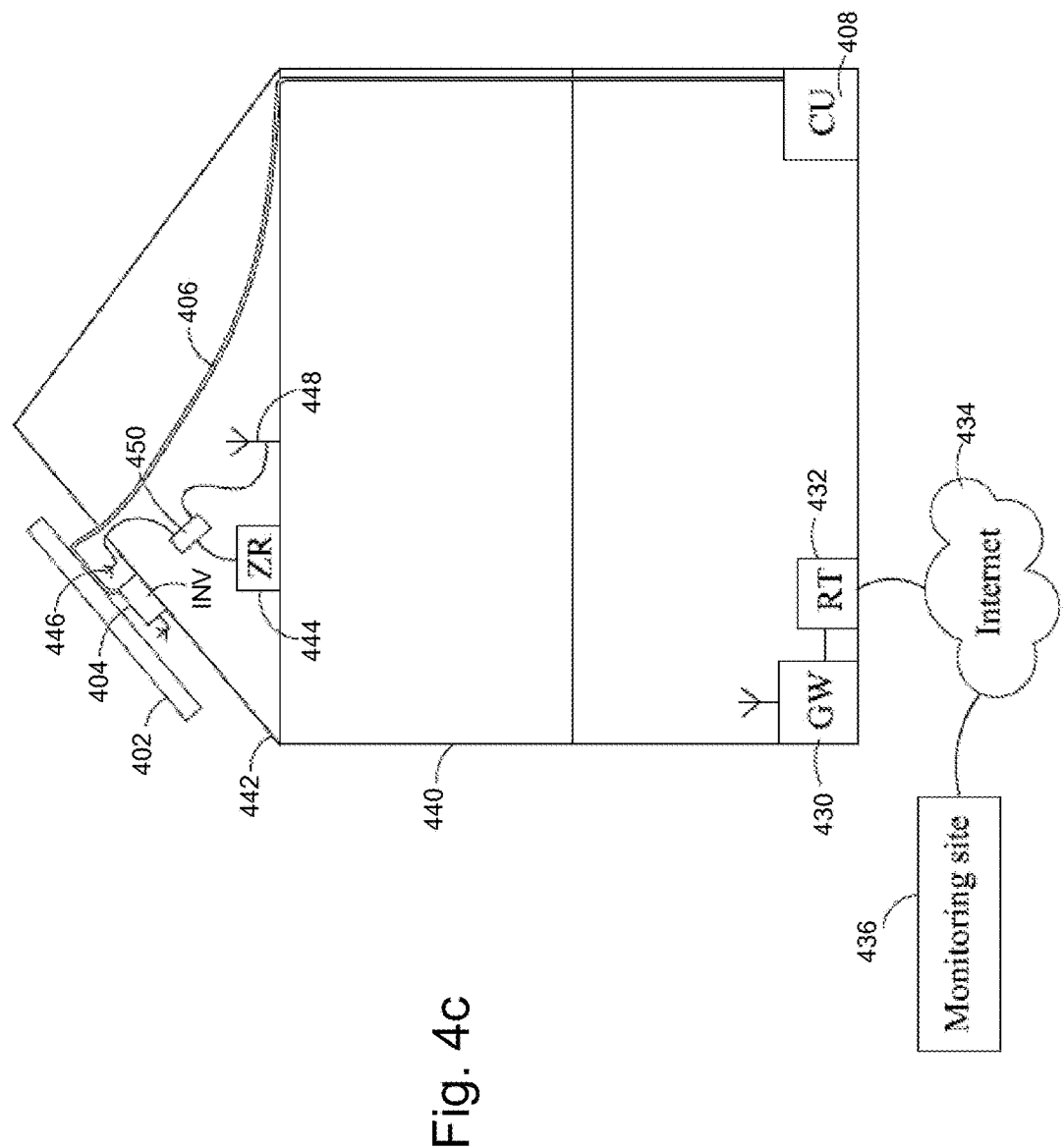

FIG. 4c illustrates an example installation of a system of the type shown in FIGS. 4a and 4b (in which only one solar panel/inverter is shown for simplicity). In the arrangement of FIG. 4c the function of the system controller 410 is implemented in a gateway 430, here a wireless base station, which also provides an interface to the solar inverter system. In this example the gateway 430 is coupled to a broadband internet modem/router 432 which provides a connection to the Internet 434. This in turn provides a remote interface 436 for a monitoring site, for example for a user or system vendor or electricity supplier.

The arrangement of FIG. 4c shows the panels on the roof 442 of a building 440 with an electricity cable 406 to a consumer unit configured to provide the grid interface 408. The illustrated example Zigbee™ repeater 444 with one antenna 446 external to the building, and one antenna 448 internal to the building, together with an optional signal splitter 450 or other arrangement. This facilitates an RF signal propagation between the system controller and the inverters, as described in more detail in our co-pending U.S. patent application Ser. No. 13/244,222 (hereby incorporated by reference), which is useful where the roof incorporates conductive thermal insulation or, in a commercial building, comprises corrugated metal sheets.

Figure 5A:
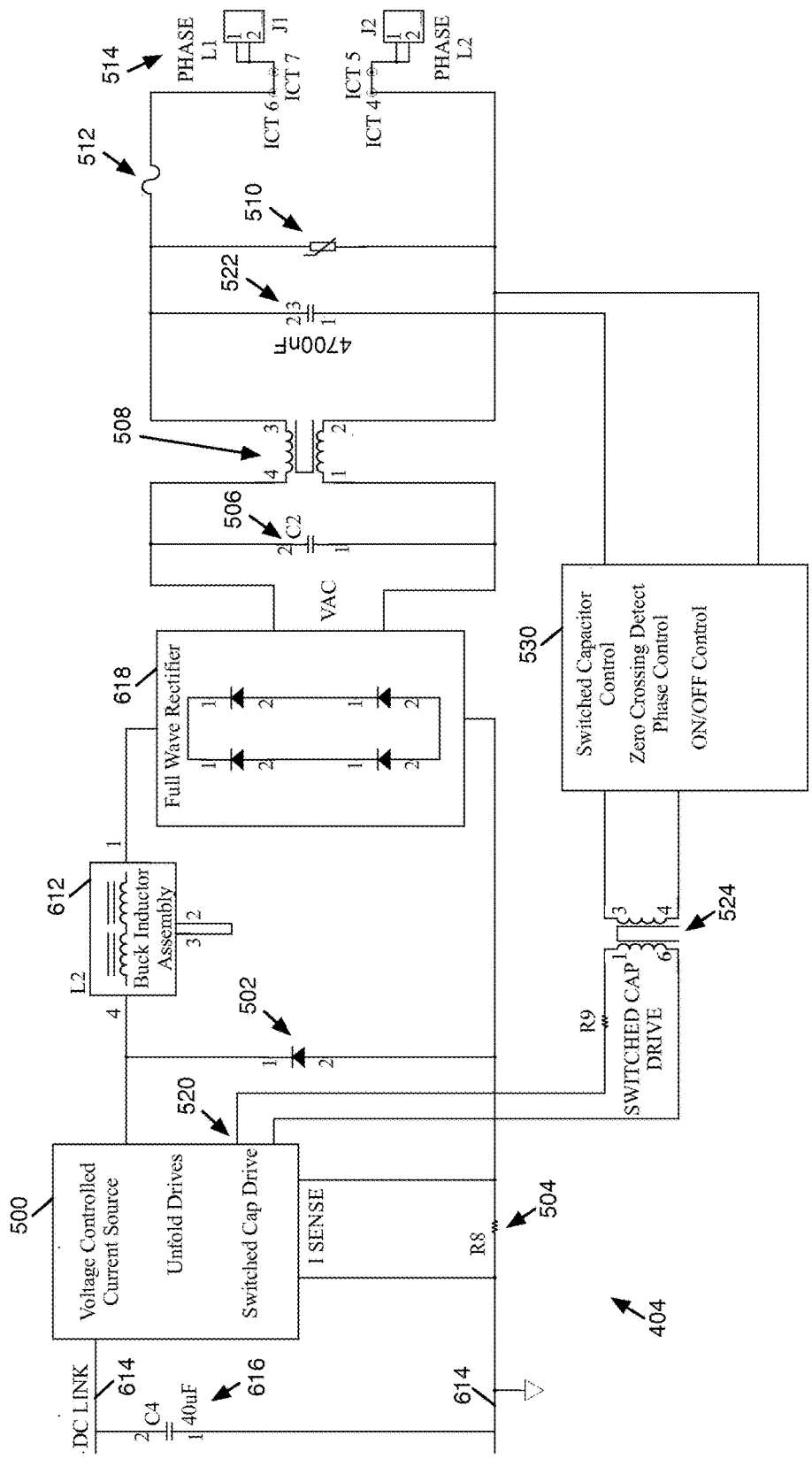
FIGS. 5a-5c show, respectively, block diagrams showing increasing detail of a solar inverter module for use with the system of FIG. 4.
Figure 5B:
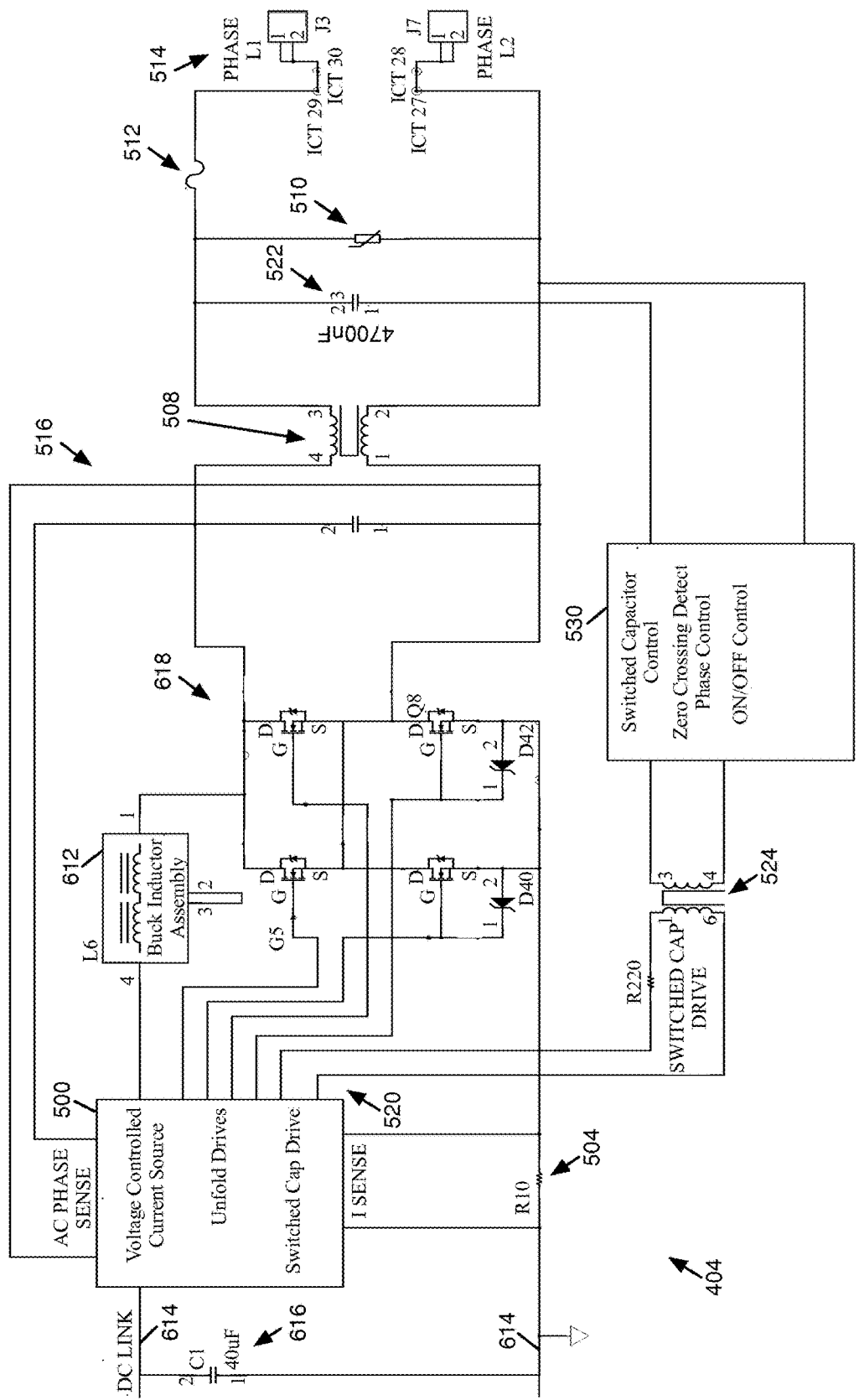
Figure 5C:
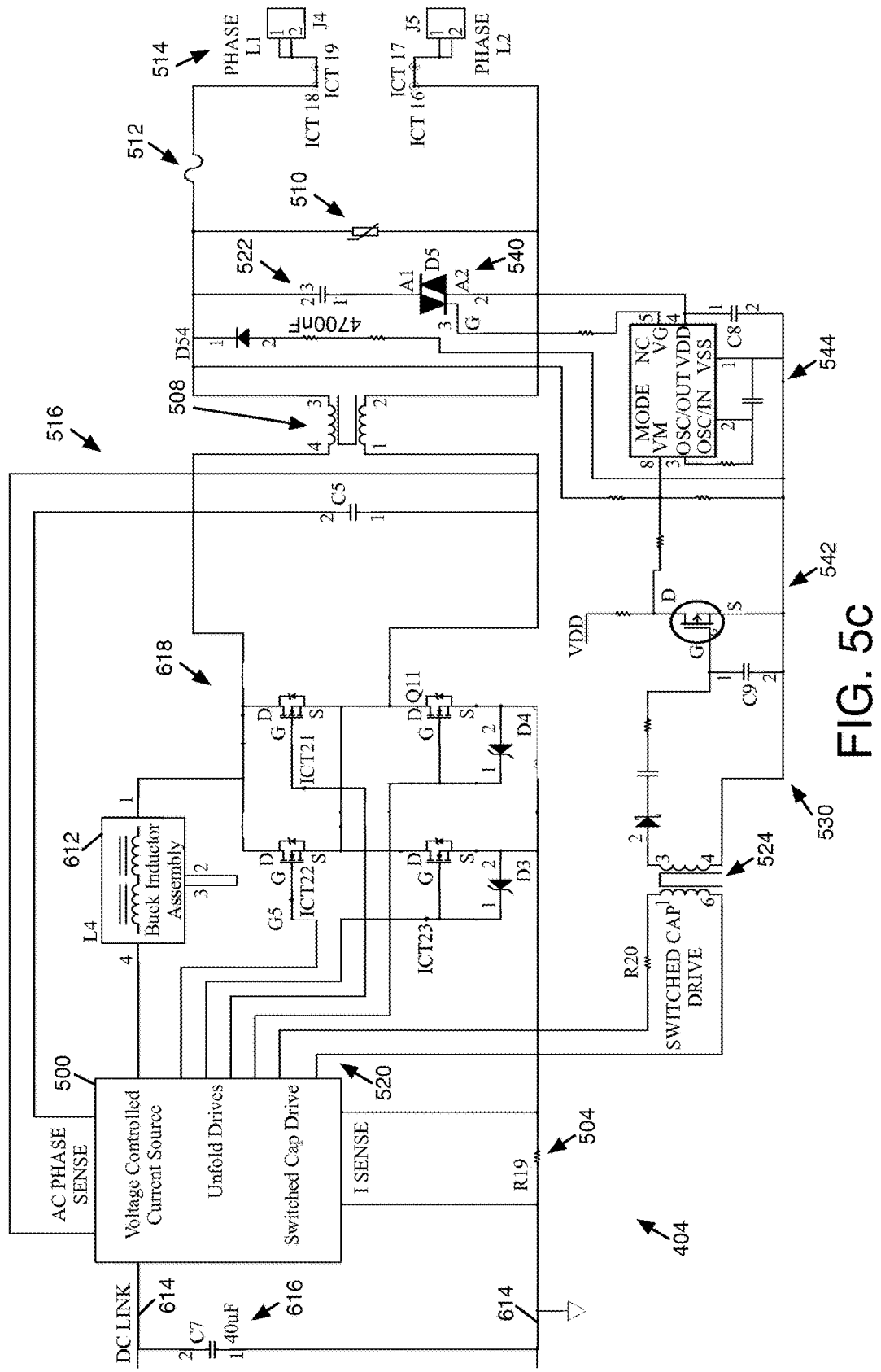

Referring now to FIG. 5 this shows a portion of an example solar inverter module 404 for the system of FIG. 4, in which like elements to those previously described are indicated by like reference numerals. FIG. 5 shows just the output portion of the solar inverter previously described, that is the portion of the inverter from the dc link onwards. Because FIGS. 5a to 5c show a similar solar inverter modules with an increasing level of detail, for simplicity these will be described together.

Thus the inverter 404 comprises a dc link 614 with an energy storage capacitor 616 which provides power to a current source stage 500, more particularly a voltage controlled current source providing power to a buck inductor assembly 612, and thence to a full wave rectifier output unfolding stage 618. In embodiments, as previously described, the current injection is regulated using current control in the inductor assembly 612 via an intermediate buck-type stage provided by current source 500 (this circuit block also includes a microcontroller and unfolding drivers, not explicitly illustrated for simplicity). The inductor (output) current is sensed by resistor 504 and compared with the reference to determine whether or not to provide current to inductor 612, thus providing current mode control. Further details can be found in our U.S. patent application Ser. No. 11/718,879, hereby incorporated by reference.

The ac output is filtered by capacitor 506 and inductor 508 and protected by varistor 510 and fuse 512 prior to ac grid mains output 514. For simplicity details of the drivers for unfolding stage 618 are shown as part of circuit block 500, using an ac phase sense connection 516 to synchronise with the grid.

Continuing to refer to FIG. 5, circuit block 500 also includes an output 520 for controlling whether or not one or more capacitors 522 are to be switched into parallel connection across ac output 514. The switched capacitor drive output 520 may, in embodiments, be provided as an output from the microcontroller 622 illustrated in FIG. 3, receiving a signal from the system controller 410 via RF transceiver 624. The switched capacitor drive output 520 is provided to a switched capacitor control circuit block 530 via an isolation transformer 524, the control block 530 responding to the switch signal to connect or disconnect capacitor 522 across ac output 514. in embodiments the switched capacitor control block 530 may implement on/off control of switching of the capacitor 522, or phase-sensitive control based on detection of 0-crossing of the capacitor current (peak detection of the grid voltage).

FIG. 5c shows details of an embodiment of the arrangement using a triac 540 to control switching of capacitor 522. Use of a triac is preferable as this is better able to handle a surge than a MOSFET. In this example implementation a transistor stage 542 couples an output of transformer 524 to a triac driver integrated circuit 544, for example an AVS08 from SGS-Thomson or similar. In embodiments this is arranged to provide a train of pulses to turn the triac on at the peak of the grid voltage (0 capacitor current), although in principle because the triac will hold itself on only one pulse need be employed if this is timed to turn the triac on when the current through the triac is rising.

The circuit of FIG. 5c also able to provide variable phase control for the switched capacitor drive output 520. This control enables the proportion of an ac cycle for which the capacitor 522 is connected across the ac mains to be varied, drive 520 thus determining a proportion of a cycle for which the capacitor is applied. This is achieved by controlling a switching point of the triac 540. in this way the effective capacitance provided across the ac grid output of the inverter module may be varied, in embodiments linearly.

In one preferred method of triac control the triac is first switched in at the zero-crossing of the grid voltage. Then, for several grid cycles, for example of order 50 cycles, the triac is driven with a continuous pulse train to assure firing at all angles while the switching current transient reduces. After the switching transient has reduced to negligible levels, the triac may be driven either with a single pulse or a pulse train only near the peak of the grid voltage.

As previously described, in preferred embodiments the inverter has the ability to sense or otherwise determine the phase of the grid voltage. Although this is not essential it is helpful, in particular for controlling triac switching. Sensing the phase of the grid voltage can help to assure adequate firing of the triac during the startup transient. This reduces stress on the VAR-control capacitor, by facilitating switching in at the zero-crossing. It also reduces power loss—by reducing the triac drive to the zero-crossing of the current, which corresponds to the peak and trough of the grid voltage after the initial current transient has been reduced to negligible levels.

The example circuits of FIG. 5 merely illustrate one preferred embodiment of a solar inverter module for use in the system we describe. The skilled person will appreciate that alternative approaches may also be employed and that, in particular, embodiments of the technique we describe for power factor control are not restricted to use with a solar inverter employing a current source followed by an inductor assembly.

Figure 6:
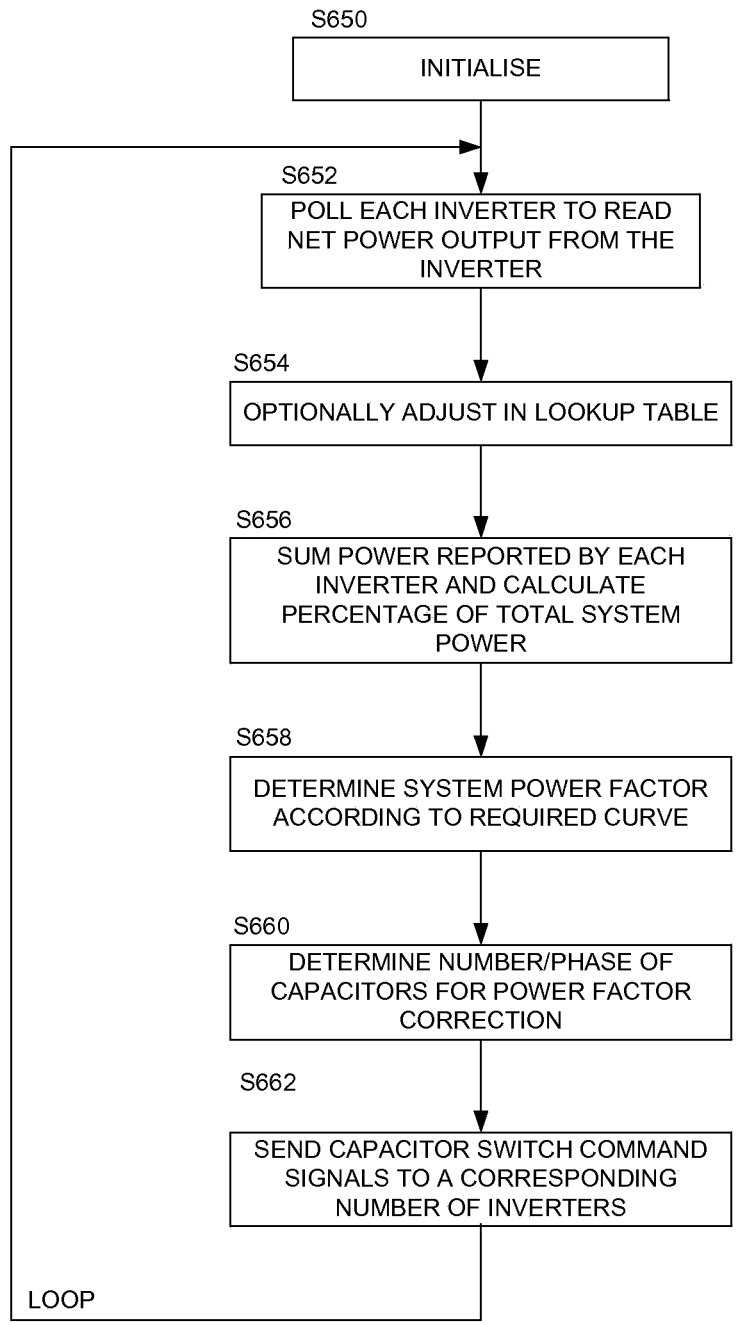
FIG. 6 shows a flow diagram of a procedure for implementation by a system controller of the system of the system of FIG. 4.

Referring next to FIG. 6, this shows an embodiment of a procedure operating on system controller 410 which controls the solar inverter modules to switch the output capacitors in or out so that the system is able to provide a power factor which varies from unity to plus 0.95 cos Φ leading. In broad terms, capacitance of 0, 1 or more modules are switched into the grid as required based on the output export power of the system, as this varies from a minimum to a maximum. Because the system comprises multiple micro-inverters connected in parallel feeding a common grid tie point (per phase in the case of a three phase system) the required capacitance is also distributed amongst the modules and if, for example, the system is extended by adding more modules, the ability to correct the power factor is also, automatically, increased.

Thus referring to FIG. 6, after initialisation (S650) the system controller polls each inverter to read the net power output from the inverter via the Zigbee™ network (S652). The controller then sums the power reported by each inverter module (S656) and calculates the power being provided by the system as a percentage of the total output power. The power read from each inverter may either be an absolute power or a percentage of the total power that particular inverter is able to provide; in this latter case the percentages may be averaged to determine the total output percentage of the system. As previously mentioned, the power factor of an inverter module (not including the capacitor) is substantially unity, but not precisely unity. Thus there may be an optional step (S654) to adjust for this non-unity power factor by means of a lookup table. This may either be performed at the inverter or in the system controller.

Once the total output power of the system as a percentage of the maximum export power is determined, the system can then lookup or otherwise determine the required system power factor (S658), for example to approximate the curve of FIG. 1a. The system then determines the number of inverters on which to switch in the output capacitance, to achieve this (S660). In one embodiment each inverter module has the same output capacitance, provided as a single switched output capacitance, but in alternative approaches an inverter may provide two or more switchable capacitances and/or different inverter modules may have differently sized switchable capacitances. The skilled person will appreciate that account may be taken of these variations in step 660. The system controller then sends capacitor switch command signals to a corresponding number of inverters (S662), and the procedure loops back to step S652.

Where phase control of the output control capacitor is provided by an inverter module step S660 may also determine a proportion of the cycle for which the capacitor is applied, this information being transmitted to the inverter modules at step S662.

Figure 7A:
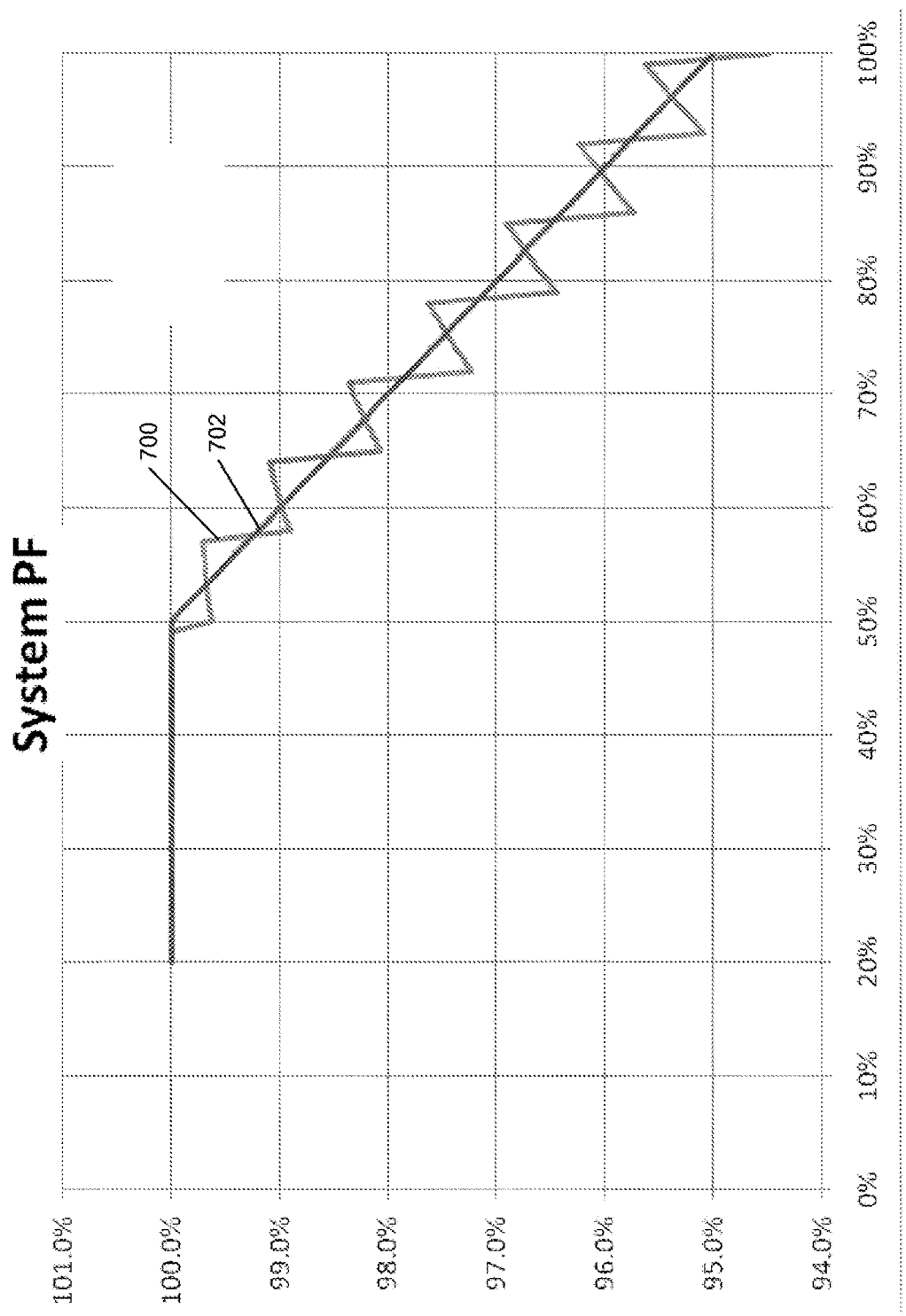
Figure 7B:
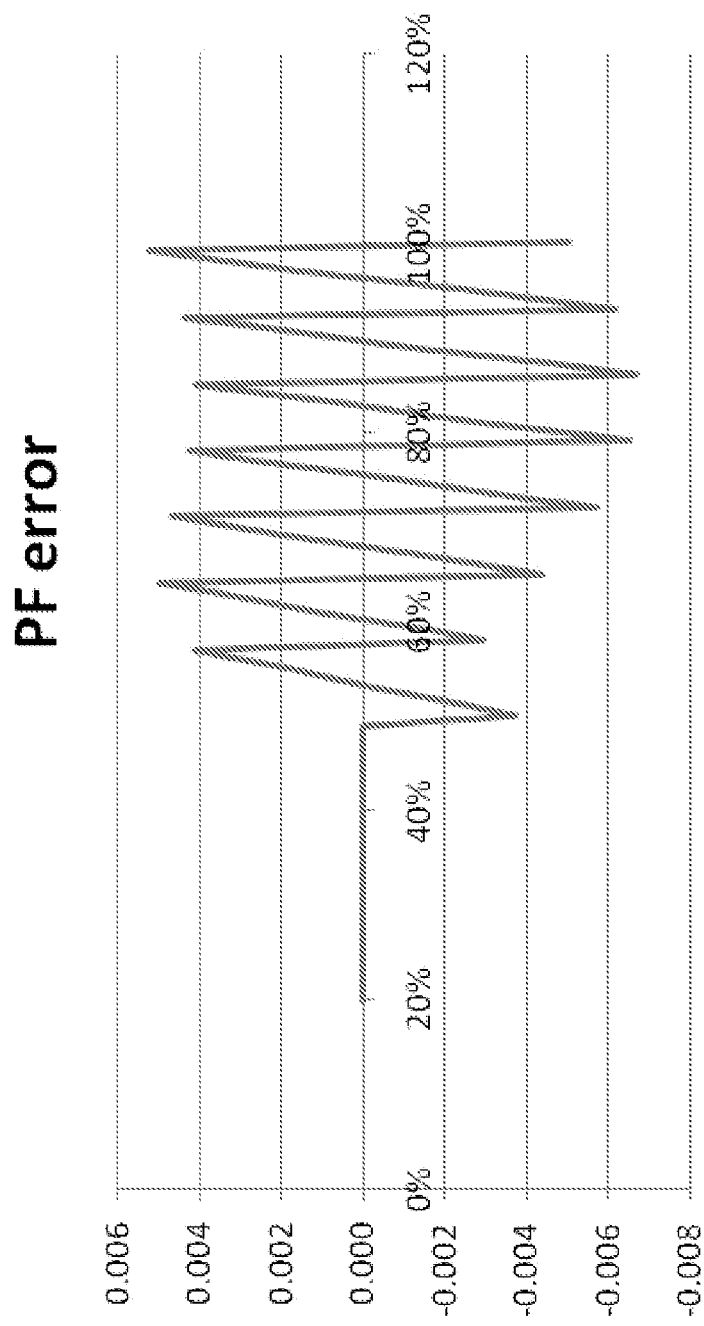

FIG. 7a shows examples of the results of the procedure of FIG. 6 for a solar inverter system of the type illustrated in FIG. 4. The staircase-form curve 700 illustrates the effect of on/off capacitor control and the linear curve 702 illustrates the effect of phase (proportional) control of the switched capacitors of the inverter modules. FIG. 7b illustrates the error in displacement power factor (cos Φ) for the staircase curve of FIG. 7a, showing the variation of this error with overall system power exported.

As can be seen from FIG. 7 and the preceding description, the power factor is controlled in steps (or linearly) by switching capacitors inside each inverter at the appropriate system power level. In embodiments of the system the net displacement power factor can be controlled in theory to within an arbitrary tolerance limit by using the power output of each inverter to be small enough to ensure an adequate number of steps. Thus for example for a system to provide a net displacement power factor within the 1% of a required value each step should cause the displacement power factor to change by at most 2% (thus changing from the target value −1% to the target value +1%). Preferably this step size should be a little smaller than this limit, to accommodate tolerances and hysteresis in the system.

In the example given above, to satisfy VDE4105 with a 3.68 kVA system the (maximum) inverter size is 736 Watts, leading to a system with 5 such inverters. In practice it is preferable to use inverters with slightly lower power and/or to provide each inverter with two or more capacitor steps, to allow some margin for error. Thus in this example a practical upper limit in inverter size for each inverter is approximately 480 Watts for inverters that each employ just a single switched VAR control capacitance.

Continuing the above example, for systems above 13.8 kVA in overall output power level, the VAR compensation required is twice that at 3.6 kVA to 13.8 kVA (a compensation of cos Φ up to 0.10 rather than 0.05). The inverters can be arranged to provide this level of VAR compensation either by providing two separately switchable VAR control capacitances in each inverter module and/or by using smaller inverters in the system, for example in the range 240 Watts-300 Watts.

Broadly speaking we have described a solar inverter system in which one or more switched VAR control capacitances are provided in each solar inverter module, sized according to the maximum output power of the inverter module, to achieve a desired power factor compensation target. These are combined together in a system with a system controller which is able to remotely control the addition of this capacitance and/or the phase of the capacitance, thus controlling the overall power factor of the system. Thus, for example, embodiments of this technique are able to control the displacement power factor of the overall system with an accuracy of 0.01 cos Φ, or better. Embodiments of the system are closed loop in the sense that they monitor inverter power output into the common grid connection and provide control data back to the inverter modules for controlling the addition/phase of the switched capacitance, but are open loop in the sense that, in embodiments, no measurement is needed of the power factor at the grid connection. The techniques we have described are applicable to both single phase and three phase architectures.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A power conditioning system for supplying AC power to an AC grid comprising:
a plurality of inverters, each of the plurality of inverters including a DC input for receiving DC power from an DC source and an AC output for supplying AC power; and
a controller configured to:
determine an AC power supplied by each inverter of the plurality of inverters;
calculate a total power supplied by the power conditioning system as a percentage of a total power capability of the power conditioning system; and
control a displacement power factor of the power conditioning system based on the percentage.

2. The power conditioning system of claim 1, wherein each inverter of the plurality of inverters includes an output capacitance that can be coupled in parallel with the AC output of each respective inverter.

3. The power conditioning system of claim 2 wherein a plurality of switching devices, one switching device for each respective inverter, controls the coupling of each output capacitance in parallel with the AC output of each respective inverter.

4. The power conditioning system of claim 3 wherein the plurality of switching devices comprise triacs.

5. The power conditioning system of claim 3 wherein the displacement power factor of the power conditioning system is controlled by controlling the plurality of switching devices.

6. The power conditioning system of claim 5 wherein the controller provides a variable degree of power factor compensation by controlling each of the plurality of switching devices for a portion of an AC cycle.

7. The power conditioning system of claim 1 wherein the controller is further configured to recognize when an inverter is added or removed from the plurality of inverters and compensate accordingly to maintain control of the displacement power factor of the power conditioning system.

8. The power conditioning system of claim 1 wherein the controller communicates with each inverter of the plurality of inverters through a wireless communication network.

9. The power conditioning system of claim 1 wherein the controller applies a threshold to the percentage such that when the percentage is below the threshold no compensation is performed, and when the percentage is above the threshold power factor compensation is employed to control the displacement power factor.

10. The power conditioning system of claim 1, wherein each inverter of the plurality of inverters includes an inductor that can be coupled in series with the AC output of each respective inverter.

* * * * *